United States Patent
Shipkovenski et al.

(10) Patent No.: US 12,218,942 B2
(45) Date of Patent: Feb. 4, 2025

(54) METHODS AND APPARATUS FOR AUTOMATIC CONFIGURATION OF A CONTAINERIZED COMPUTING NAMESPACE

(71) Applicant: VMware LLC, Palo Alto, CA (US)

(72) Inventors: Miroslav Shipkovenski, Sofia (BG); Stanislav Asenov Hadjiiski, Sofia (BG); Georgi Muleshkov, Sofia (BG)

(73) Assignee: VMware LLC, Palo Alto, CA (US)

( * ) Notice: Subject to any disclaimer, the term of this patent is extended or adjusted under 35 U.S.C. 154(b) by 755 days.

(21) Appl. No.: 16/994,099

(22) Filed: Aug. 14, 2020

(65) Prior Publication Data
US 2022/0053001 A1    Feb. 17, 2022

(51) Int. Cl.
*H04L 9/40* (2022.01)
*G06F 9/445* (2018.01)
*G06F 9/455* (2018.01)

(52) U.S. Cl.
CPC ........ *H04L 63/102* (2013.01); *G06F 9/44505* (2013.01); *G06F 9/45545* (2013.01); *H04L 63/0823* (2013.01); *H04L 63/20* (2013.01)

(58) Field of Classification Search
CPC ... H04L 63/102; H04L 63/0823; H04L 63/20; H04L 63/0272; G06F 9/44505; G06F 9/45545; G06F 9/45533
See application file for complete search history.

(56) References Cited

U.S. PATENT DOCUMENTS

| | | | |
|---|---|---|---|
| 2020/0153623 A1* | 5/2020 | Asanghanwa | H04L 9/3213 |
| 2021/0132974 A1* | 5/2021 | Watt, Jr. | G06F 9/4856 |
| 2021/0149769 A1* | 5/2021 | Balcha | G06F 11/1469 |
| 2021/0218750 A1* | 7/2021 | Wells | H04L 69/162 |
| 2021/0266289 A1* | 8/2021 | Maw | G06F 21/6218 |
| 2021/0311763 A1* | 10/2021 | Beard | G06F 8/65 |
| 2021/0382727 A1* | 12/2021 | Vigil | G06F 9/5022 |
| 2021/0382728 A1* | 12/2021 | Chan | G06F 9/4843 |
| 2021/0397729 A1* | 12/2021 | McQuaid | G06F 21/6218 |

OTHER PUBLICATIONS

Angel Beltre et al., "Enabling HPC workloads on Cloud Infrastructure using Kubernetes Container Orchestration Mechanism," 2019, pp. 11-20. (Year: 2019).*

Alexandra Borisova et al., :Adaptation of the TOSCA standard model for the Kubernetes container environment, 2020, pp. 9-14. (Year: 2020).*

* cited by examiner

*Primary Examiner* — Luu T Pham
*Assistant Examiner* — Canh Le
(74) *Attorney, Agent, or Firm* — Quarles & Brady LLP

(57) ABSTRACT

Methods, apparatus, systems and articles of manufacture for automatic configuration of a containerized computing namespace are disclosed. An example method includes identifying, in response to creation of a containerized computing namespace, a user account that is to be granted access to a containerized computing namespace, creating a service account, the service account representing the user account for the containerized computing namespace creating a role within the containerized computing namespace, and assigning a role binding between the role and the service account.

11 Claims, 9 Drawing Sheets

```
apiVersion: v1
kind: Config
preferences: {} clusters:
- cluster:
    certificate-authority-data: <CERTIFICATE DATA FROM SECRET>
    server: https://<K8S CLUSTER ADDRESS>
  name: dev-cluster users:
- name: dev-user
  user:
    as-user-extra: {}
    client-key-data: <CERTIFICATE DATA FROM SECRET>
    token: <TOKEN FROM SECRET> contexts:
- context:
    cluster: dev-cluster
    namespace: dev-namespace
    user: dev-user
  name: dev-namespace current-context: dev-namespace
```

FIG. 7

METHODS AND APPARATUS FOR AUTOMATIC CONFIGURATION OF A CONTAINERIZED COMPUTING NAMESPACE

FIELD OF THE DISCLOSURE

This disclosure relates generally to virtualization of computing services, and, more particularly, to methods and apparatus for automatic configuration of a containerized computing namespace.

BACKGROUND

Virtualizing of computer systems provides benefits such as an ability to execute multiple computer systems on a single hardware computer, replicating computer systems, moving computer systems among multiple hardware computers, dynamically increasing and/or decreasing computing resources allocated to a particular computing service, and so forth.

"Infrastructure-as-a-Service" (also commonly referred to as "IaaS") generally describes a suite of technologies provided by a service provider as an integrated solution to allow for elastic creation of a virtualized, networked, and pooled computing platform (sometimes referred to as a "cloud computing platform"). Enterprises may use IaaS as a business-internal organizational cloud computing platform (sometimes referred to as a "private cloud") that gives an application developer access to infrastructure resources, such as virtualized servers, storage, and networking resources. By providing ready access to the hardware resources required to run an application, the cloud computing platform enables developers to build, deploy, and manage the lifecycle of a web application (or any other type of networked application) at a greater scale and at a faster pace than ever before.

Cloud computing environments may include many processing units (e.g., servers). Other components of a cloud computing environment include storage devices, networking devices (e.g., switches), etc. Current cloud computing environment configuration relies on much manual user input and configuration to install, configure, and deploy the components of the cloud computing environment.

BRIEF DESCRIPTION OF THE DRAWINGS

FIG. 7 is a template configuration file that may be utilized by the example cluster orchestrator of FIGS. 1 and/or 2.

Figure 1:
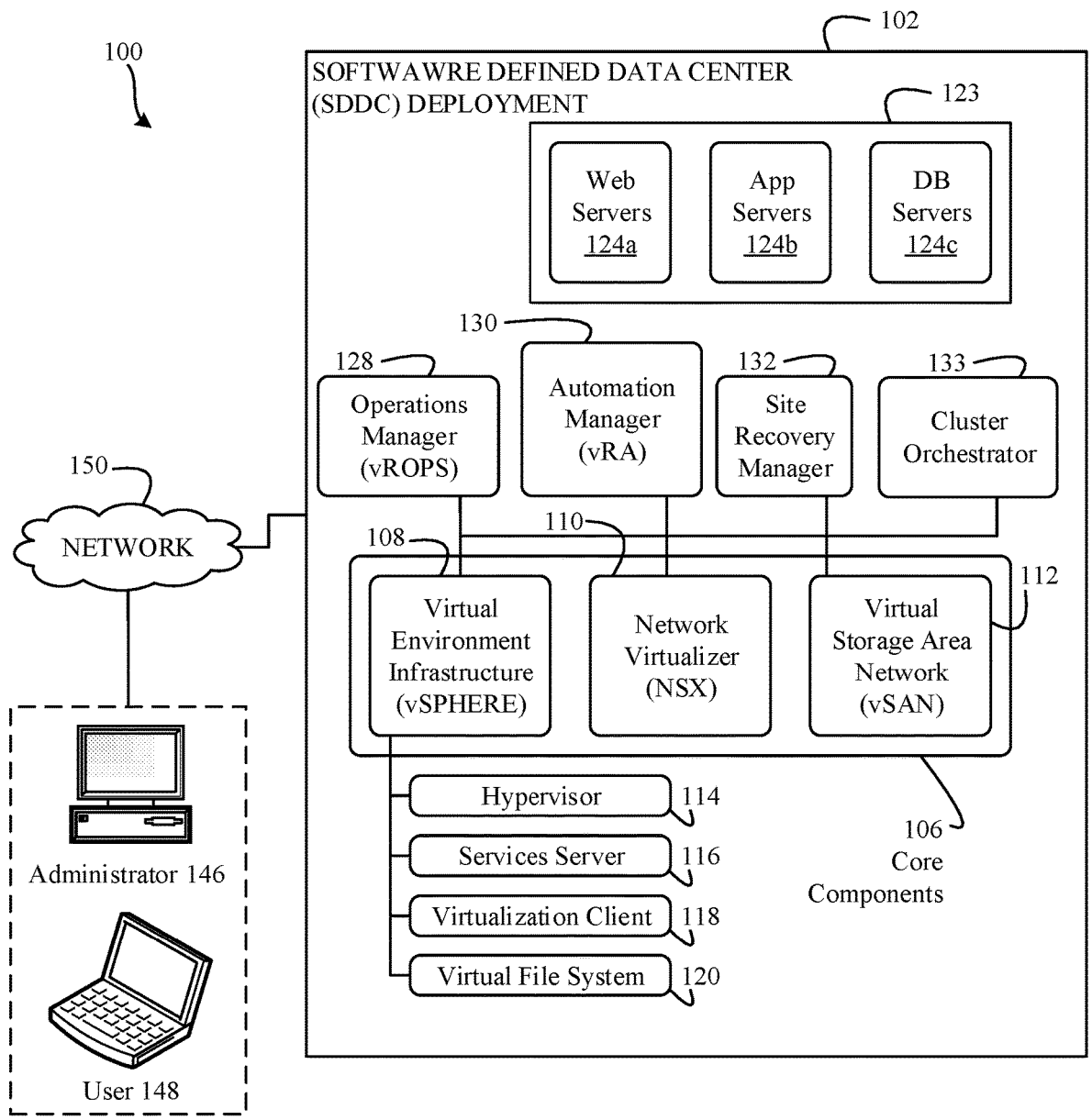
FIG. 1 illustrates an example environment of use including a software-defined data center (SDDC) implemented in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

Cloud computing platforms may provide many powerful capabilities for performing computing operations. However, taking advantage of these computing capabilities manually may be complex and/or require significant training and/or expertise. Prior techniques for providing cloud computing platforms and services often require customers to understand details and configurations of hardware and software resources to establish and configure the cloud computing platform. Configuring such cloud computing platforms may involve long running operations and/or complex operations (e.g., a sequence of operations including multiple steps).

A software defined data center (SDDC) is a data storage facility implemented using an infrastructure that is virtualized and delivered as a service to one or more customers. After deployment of a SDDC, the SDDC provides policy-driven automation to enable provisioning and ongoing management of logical compute resources, storage resources, and network resources. For example, customers may select/create policies that cause the SDDC to deploy applications quickly based on policy-driven provisioning that dynamically matches resources to continually changing workloads and business demands. An SDDC can be deployed as a private cloud, a hybrid cloud, or a public cloud and can run on multiple hardware stacks, hypervisors, and clouds.

A virtual machine (VM) is a software computer that, like a physical computer, runs an operating system and applications. An operating system installed on a virtual machine is referred to as a guest operating system. Because each virtual machine is an isolated computing environment, virtual machines (VMs) can be used as desktop or workstation environments, as testing environments, to consolidate server applications, etc. Virtual machines can run on hosts or clusters. The same host can run a plurality of VMs, for example.

As used herein, availability refers to the level of redundancy required to provide continuous operation expected for the workload domain. As used herein, performance refers to the computer processing unit (CPU) operating speeds (e.g., CPU gigahertz (GHz)), memory (e.g., gigabytes (GB) of random access memory (RAM)), mass storage (e.g., GB hard drive disk (HDD), GB solid state drive (SSD)), and power capabilities of a workload domain. As used herein, capacity refers to the aggregate number of resources (e.g., aggregate storage, aggregate CPU, etc.) across all servers associated with a cluster and/or a workload domain. In examples disclosed herein, the number of resources (e.g., capacity) for a workload domain is determined based on the redundancy, the CPU operating speed, the memory, the storage, the security, and/or the power requirements selected by a user. For example, more resources are required for a workload domain as the user-selected requirements increase (e.g., higher redundancy, CPU speed, memory, storage, security, and/or power options require more resources than lower redundancy, CPU speed, memory, storage, security, and/or power options).

Many different types of virtualization environments exist. Three example types of virtualization environments are: full virtualization, paravirtualization, and operating system virtualization.

Full virtualization, as used herein, is a virtualization environment in which hardware resources are managed by a hypervisor to provide virtual hardware resources to a virtual machine. In a full virtualization environment, the virtual machines do not have direct access to the underlying hardware resources. In a typical full virtualization environment, a host operating system with embedded hypervisor (e.g., a VMware ESXi™ hypervisor) is installed on the server hardware. Virtual machines including virtual hardware resources are then deployed on the hypervisor. A guest operating system is installed in the virtual machine. The hypervisor manages the association between the hardware resources of the server hardware and the virtual resources allocated to the virtual machines (e.g., associating physical random access memory (RAM) with virtual RAM). Typically, in full virtualization, the virtual machine and the guest operating system have no visibility and/or direct access to the hardware resources of the underlying server. Additionally, in full virtualization, a full guest operating system is typically installed in the virtual machine while a host operating system is installed on the server hardware. Example full virtualization environments include VMware ESX®, Microsoft Hyper-V®, and Kernel Based Virtual Machine (KVM).

Paravirtualization, as used herein, is a virtualization environment in which hardware resources are managed by a hypervisor to provide virtual hardware resources to a virtual machine and guest operating systems are also allowed direct access to some or all of the underlying hardware resources of the server (e.g., without accessing an intermediate virtual hardware resource). In a typical paravirtualization system, a host operating system (e.g., a Linux-based operating system) is installed on the server hardware. A hypervisor (e.g., the Xen® hypervisor) executes on the host operating system. Virtual machines including virtual hardware resources are then deployed on the hypervisor. The hypervisor manages the association between the hardware resources of the server hardware and the virtual resources allocated to the virtual machines (e.g., associating physical random access memory (RAM) with virtual RAM). In paravirtualization, the guest operating system installed in the virtual machine is configured also to have direct access to some or all of the hardware resources of the server. For example, the guest operating system may be precompiled with special drivers that allow the guest operating system to access the hardware resources without passing through a virtual hardware layer. For example, a guest operating system may be precompiled with drivers that allow the guest operating system to access a sound card installed in the server hardware. Directly accessing the hardware (e.g., without accessing the virtual hardware resources of the virtual machine) may be more efficient, may allow for performance of operations that are not supported by the virtual machine and/or the hypervisor, etc.

OS virtualization is also referred to herein as container virtualization. As used herein, OS virtualization refers to a system in which processes are isolated in an OS. In a typical OS virtualization system, a host OS is installed on the server hardware. Alternatively, the host OS may be installed in a VM of a full virtualization environment or a paravirtualization environment. The host OS of an OS virtualization system is configured (e.g., utilizing a customized kernel) to provide isolation and resource management for processes that execute within the host OS (e.g., applications that execute on the host OS). Thus, a process executes within a container that isolates the process from other processes executing on the host OS. Thus, OS virtualization provides isolation and resource management capabilities without the resource overhead utilized by a full virtualization environment or a paravirtualization environment. Example OS virtualization environments include Linux Containers LXC and LXD, the DOCKER™ container platform, the OPENVZ™ container platform, etc.

Containerization is an OS virtualization technique used to distribute functions of an application to be executed at different nodes in a cluster (e.g., containerized micro-services). Containerization isolates services running on the same hardware into respective executing environments. A container can be used to place an application or program and its dependencies (e.g., libraries, drivers, configuration files, etc.) into a single package that executes as its own executable environment on hardware. Through such isolation, containerized services are restricted from accessing resources of other containerized services. Container orchestration services can be used to coordinate or orchestrate the deployments and inter-operability of containerized services across geographic regions. Kubernetes® cluster orchestration system is an example of one such container orchestration service. Kubernetes® clusters are often used in environments with many users spread across multiple teams and projects.

To achieve isolation of cluster resources between users, Kubernetes supports virtual clusters backed by a same physical cluster. These virtual clusters are referred to as namespaces. In examples disclosed herein, such namespaces are referred to as containerized computing namespaces. Namespaces provide a number of important features including, for example, providing scopes for names of resources which need to unique within a namespace, but not necessarily across different namespaces; dividing cluster resources between multiple users using a resource quota; and restricting resource access across namespaces using role based access control (RBAC) authorization.

RBAC is an approach for regulating access to computer and/or network resources based on roles assigned to individual users within an enterprise. Kubernetes provides an RBAC application programming interface (API) to enable cluster administrators to define user roles for granting and/or limiting user access to particular resources within a namespace. A user gains access to a cluster and/or namespace by using a configuration file (e.g., a kubeconfig file) that includes basic information about the cluster including, for example, cluster address(es), authentication mechanisms, etc. Unfortunately, RBAC settings are not standard when a namespace is created on a cluster. When creating a namespace, a cluster admin has to manually create a set of resources for each namespace including, for example, service accounts (representing users), roles, role bindings, etc. to enable RBAC functionality.

Example approaches disclosed herein enable automatic creation of RBAC restrictions on a namespace as it is created. By performing such automated creation of restrictions, such approaches thereby hide the complexities of manual RBAC configuration in a Kubernetes cluster. Moreover, because such permissions are automatically created, credential and/or secret information can be stored and later provided to a user on demand to enable more expedient access to the cluster. Thus, example approaches disclosed herein also generate configuration files for use by users to enable access to the cluster.

FIG. 1 illustrates an example environment of use 100 including a software-defined data center (SDDC) 102 implemented in accordance with the teachings of this disclosure. The example SDDC 102 of the illustrated example of FIG. 1 includes core components 106, deployed servers 123, an operations manager 128, an automation manager 130, a site recovery manager 132, and a cluster orchestrator 133. An example administrator 146 and/or user 148 access the SDDC 102 via a network 150.

The example core components 106 of the illustrated example include a virtual environment infrastructure 108, an example network virtualizer 110, and an example virtual storage area network 112. The example virtual environment infrastructure 108 is a virtualization platform that includes an example hypervisor 114, an example services server 116, an example virtualization client 118, and example virtual file system 120. In the illustrated example, the virtual environment infrastructure 108 may be implemented using the vSphere virtualization suite developed and sold by VMware® of Palo Alto, California, United States. The example hypervisor 114 may be implemented using the VMware ESXi™ hypervisor developed and sold by VMware® The example services server 116 may be implemented using the VMware vCenter® Server developed and sold by VMware® The example virtualization client 118 may be implemented using the VMware vSphere® client developed and sold by VMware®. The example virtual file system 120 may be implemented using the VMware vSphere Virtual Machine File System developed and sold by VMware® Additionally or alternatively, some or all of the components of the virtual environment infrastructure 108 may be implemented using products, software, systems, hardware, etc. from companies other than VMware. In other examples, the virtual environment infrastructure 108 may include additional or different components other than those shown in FIG. 1.

The example network virtualizer 110 is a network virtualization platform that may be used to provide virtual network resources for network computing environments. The example network virtualizer 110 may be implemented using the VMware NSX® network virtualization platform developed and sold by VMware®. The example virtual storage area network 112 is a data storage virtualization platform that may be used to provide virtual data store resources for network computing environments. The example virtual storage area network 112 may be implemented using the VMware® Virtual SAN™ (vSAN) software-defined storage platform developed and sold by VMware®. Additionally or alternatively, the network virtualizer 110 and/or the virtual storage area network 112 may be implemented using products from companies other than VMware®.

In the illustrated example of FIG. 1, one or more VMs (or containers) are used to implement the deployed servers 123. In the illustrated example, the servers 123 include one or more example web servers 124a, one or more example app servers 124b, and one or more database (DB) servers 124c. The servers 123 are deployed and/or configured by one or more of an example operations manager 128, an example automation manager 130, and an example site recovery manager 132. The example operations manager 128 is provided to automate information technology (IT) operations management of the SDDC 102 to run the servers 123. The example operations manager 128 may be implemented using the VMware® vRealize® Operations (vROPS) IT Operations Management product developed and sold by VMware®. The example operations manager 128 is provided to automate responsive actions to business needs in real-time to deliver personalized infrastructure, applications, and IT operations when business needs arise within the SDDC 102. The example automation manager 130 may be implemented using the VMware's vRealize® Automation (vRA) product developed and sold by VMware®. The example site recovery manager 132 is provided to implement different levels of availability of the SDDC 102 for different servers 123. For example, some servers 123 may require higher levels of redundancy or network rerouting capabilities to ensure a higher level of availability for services (e.g., access to the servers 123 and/or underlying data) even during resource failures. In some examples, other, non-critical servers 123 may only require low to moderate availability. The example site recovery manager 132 may be implemented using the VMware® Site Recovery Manager Disaster Recovery Software developed and sold by VMware®.

The example cluster orchestrator 133 of the illustrated example of FIG. 1 orchestrates creation of namespaces and permissions within those namespaces. In some examples, the cluster orchestrator 133

Figure 2:
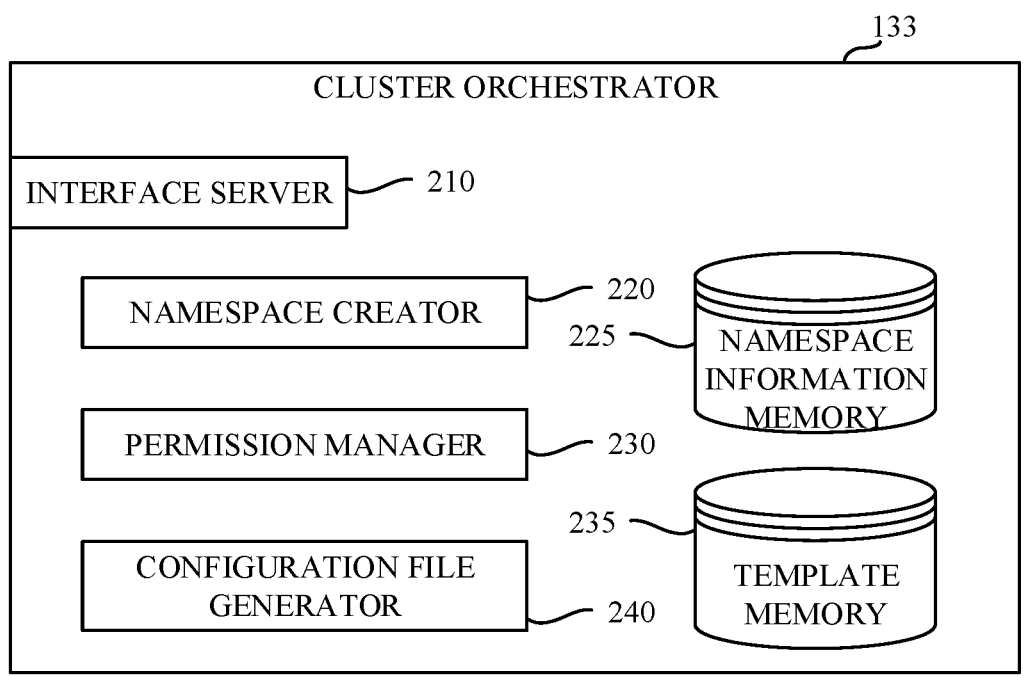
FIG. 2 is a block diagram illustrating an example implementation of the cluster orchestrator of FIG. 1.

FIG. 2 is a block diagram illustrating an example implementation of the cluster orchestrator 133 of FIG. 1. The example cluster orchestrator 133 of FIG. 2 includes an interface server 210, a namespace creator 220, a namespace information memory 225, a permission manager 230, a template memory 235, and a configuration file generator 240.

The example interface server 210 of the illustrated example of FIG. 2 is implemented by a web server that returns instructions that cause an application (e.g., a browser) executed at a user computer (e.g., a computer of the user 148 or the administrator 146) to display an interface. In some examples, the instructions are implemented as HyperText Markup Language (HTML) instructions. However, any other approach to displaying an interface may additionally or alternatively be used. Moreover, while in the illustrated example, the interface server 210 is implemented as a web server that remotely displays an interface, in some examples, the interface may displayed locally at the cluster orchestrator 133. In examples disclosed herein, the interface server 210 receives user instructions that are relayed to the example namespace creator 220 and/or the example configuration file generator 240. In some examples, the interface server 210 provides the configuration file generated by the configuration file generator 240 to the user.

The example namespace creator 220 of the illustrated example of FIG. 2 creates a requested namespace by interacting with the automation manager 130. The example namespace creator 220 stores the namespace information in the namespace information memory 225. (Block 420). In examples disclosed herein, the namespace information includes an address of the cluster. As noted below, the stored namespace information is later used for creation of a configuration file that enables a user to access the namespace. Thus, the namespace information may include any additional information that may be used for creation of the configuration file for accessing the namespace.

In examples disclosed herein, the example namespace creator 220 causes the initial creation of namespace. However, in some examples, the namespace may already exist. In such an example, the example namespace creator 220 monitors for newly created namespaces, and causes the example permission manager 230 to create the appropriate roles and/or accounts such that configuration files can be generated.

The example namespace information memory 225 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example namespace information memory 225 may be in any data format such as, for example, binary data, comma delimited data, tab delimited data, structured query language (SQL) structures, etc. While, in the illustrated example, the namespace information memory 225 is illustrated as a single device, the example namespace information memory 225 and/or any other data storage devices described herein may be implemented by any number and/or type(s) of memories. In the illustrated example of FIG. 2, the example namespace information memory 225 stores information used during creation of the namespace, accounts and/or roles associated with the namespace, and information about the accounts and/or roles associated with the namespace to enable generation of a configuration file (e.g., a kubeconfig) file for use by the user 148 to access the Kubernetes namespace.

The example permission manager 230 of the illustrated example of FIG. 2 creates and/or manages permissions for the namespace. The example permission manager 230 identifies a user account that is to be granted access to the namespace. The example permission manager 230 creates a service account representing the user account for the namespace. The example permission manager 230 creates secret information for the user account for accessing the namespace. In examples disclosed herein, the secret information includes a token and a certificate. However, any other secret information may additionally or alternatively be used such as, for example, a password. The example permission manager 230 stores the secret information in the namespace information memory 225. Storing the secret information allows the secret information to later be recalled when generating a configuration file for the user.

The example permission manager 230 creates a role within the namespace with appropriate permissions for the identified user account. In some examples, a role having the desired permissions may already exist. In such an example, the permission manager 230 may either skip creation of the role or, alternatively may create a copy of the role that is specific to the service account. Creating a copy of the role (e.g., such that the role is specific to the service account) enables subsequent permissions changes associated with the role to be applied to the service account without unintentionally affecting other user accounts that might be associated with a particular role. Not creating the copy of the role, conversely, allows multiple user accounts to be associated with the role, and as a result, enables a single permission change to the role to affect the associated user accounts. The example permission manager 230 assigns the created role to the service account. Thus, when a user uses a configuration file specifying the service account, the user will be afforded the permissions of the role associated with the user account.

In examples disclosed herein, the permission manager creates multiple user accounts and/or roles to grant various users access to the Kubernetes namespace. In this manner, during creation of the namespace, permissions can be appropriately configured for users, instead of relying on later configuration of individual user accounts.

The example template memory 235 of the illustrated example of FIG. 2 is implemented by any memory, storage device and/or storage disc for storing data such as, for example, flash memory, magnetic media, optical media, solid state memory, hard drive(s), thumb drive(s), etc. Furthermore, the data stored in the example template memory 235 may be in any data format such as, for example, binary data, comma delimited data, tab delimited data, structured query language (SQL) structures, etc. While, in the illustrated example, the template memory 235 is illustrated as a single device, the example template memory 235 and/or any other data storage devices described herein may be implemented by any number and/or type(s) of memories. In the illustrated example of FIG. 2, the example template memory 235 stores one or more template configuration files that are used by the configuration file generator to generate a configuration file.

The example configuration file generator 240 of the illustrated example of FIG. 2 generates a configuration file for use by the user 148 to access a Kubernetes namespace. In examples disclosed herein, the configuration file is a KubeConfig file that is used to control access by a user to a Kubernetes system. Kubeconfig files are used to organize information about clusters, users, namespaces, and authentication mechanisms by the user. For example, the user may utilize a command-line tool, such as kubectl, to process the configuration file and communicate with a server of a cluster. However, any other type of configuration file may additionally or alternatively be generated. Further, the configuration file may be used with any other cluster access tool and/or system.

The example configuration file generator 240 generates the configuration file in response to a user request received via the interface server 210. To generate the configuration file, the example configuration file generator 240 accesses a template stored in the example template memory 235 and inserts information into portions of the template to create the configuration file. For example, the example configuration file generator 240 obtains secret information associated with the service account for the user that is associated with the namespace, and the cluster address for insertion into the template. In examples disclosed herein, the cluster address and the secret information associated with the service account for the user that is associated with the namespace are obtained from the namespace information memory 225. However, in some examples, the namespace information and secret information may be provided to the configuration file generator 240 via, for example the interface server 210 (e.g., by a user).

Upon creation of the configuration file based on the template, the example configuration file generator 240 stores the configuration file in the example namespace information memory 225. In this manner, the completed configuration file can be provided to the user at a later time without the need for re-generation of the configuration file. However, in some examples, the stored configuration file may be removed after a period of time (e.g., after the file is provided to the user, after a threshold amount of time has elapsed, etc.) to reduce resource requirements. The example configuration file generator 240 provides the configuration to the requesting user via the interface server 210.

Figure 3:
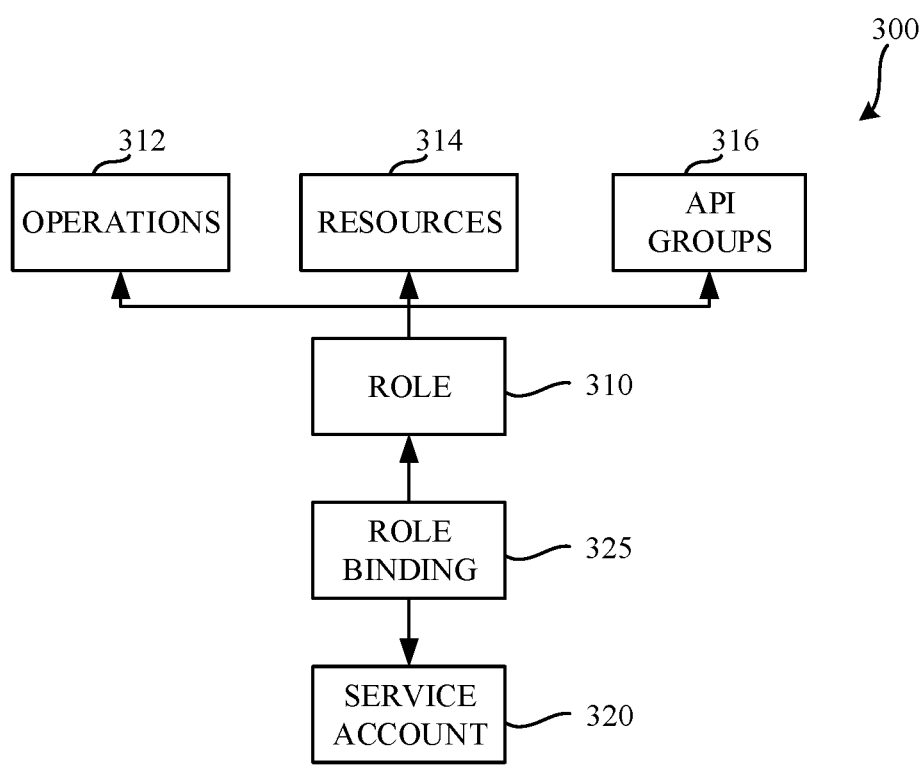
FIG. 3 is a block diagram illustrating an example RBAC model.

FIG. 3 is a block diagram illustrating an example RBAC model 300. The example RBAC model 300 of FIG. 3 includes a role 310 which is associated with operations 312, resources 314, and API groups 316. A service account 320 is associated with the role 310 via a role binding 325.

The example role 310 includes rules that represent a set of permissions. The permissions enable and/or disable access of users associated with the role 310 to particular operations 312, resources 314, and/or API groups 316. In examples disclosed herein, operations 312 represent various functions that can be performed within the namespace. Such operations may include various Hypertext Transfer Protocol verbs such as, for example, LIST. Resources 314 represent various Kubernetes pods within the namespace. API groups 316 represent access to various API functionalities and/or interfaces such as, for example, Batch, Kubernetes, Storage, etc. Different roles will be expected to have different levels of access to the operations 312, the resources 314, and the API groups 316. For example, a power user role will be expected to have greater access to the operations 312, the resources 314, and the API groups 316 than a regular user role.

The service account 320 provides an identity for processes that run in a Kubernetes pod. Each namespace includes a service account 320 (e.g., a default account) that points to a secret. The secret includes a token that is expected by the automation manager 130 when authenticating the user 148. The role binding 325 grants permissions defined in the role 310 to a service account 320 representing a user and/or a set of users.

While an example manner of implementing the example cluster orchestrator 133 of FIG. 1 is illustrated in FIG. 2, one or more of the elements, processes and/or devices illustrated in FIG. 2 may be combined, divided, re-arranged, omitted, eliminated and/or implemented in any other way. Further, the example interface server 210, the example namespace creator 220, the example permission manager 230, the example configuration file generator 240, and/or, more generally, the example cluster orchestrator 133 of FIG. 2 may be implemented by hardware, software, firmware and/or any combination of hardware, software, and/or firmware. Thus, for example, any of the example interface server 210, the example namespace creator 220, the example permission manager 230, the example configuration file generator 240, and/or, more generally, the example cluster orchestrator 133 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of example interface server 210, the example namespace creator 220, the example permission manager 230, the example configuration file generator 240, and/or, more generally, the example cluster orchestrator 133 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example cluster orchestrator 133 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
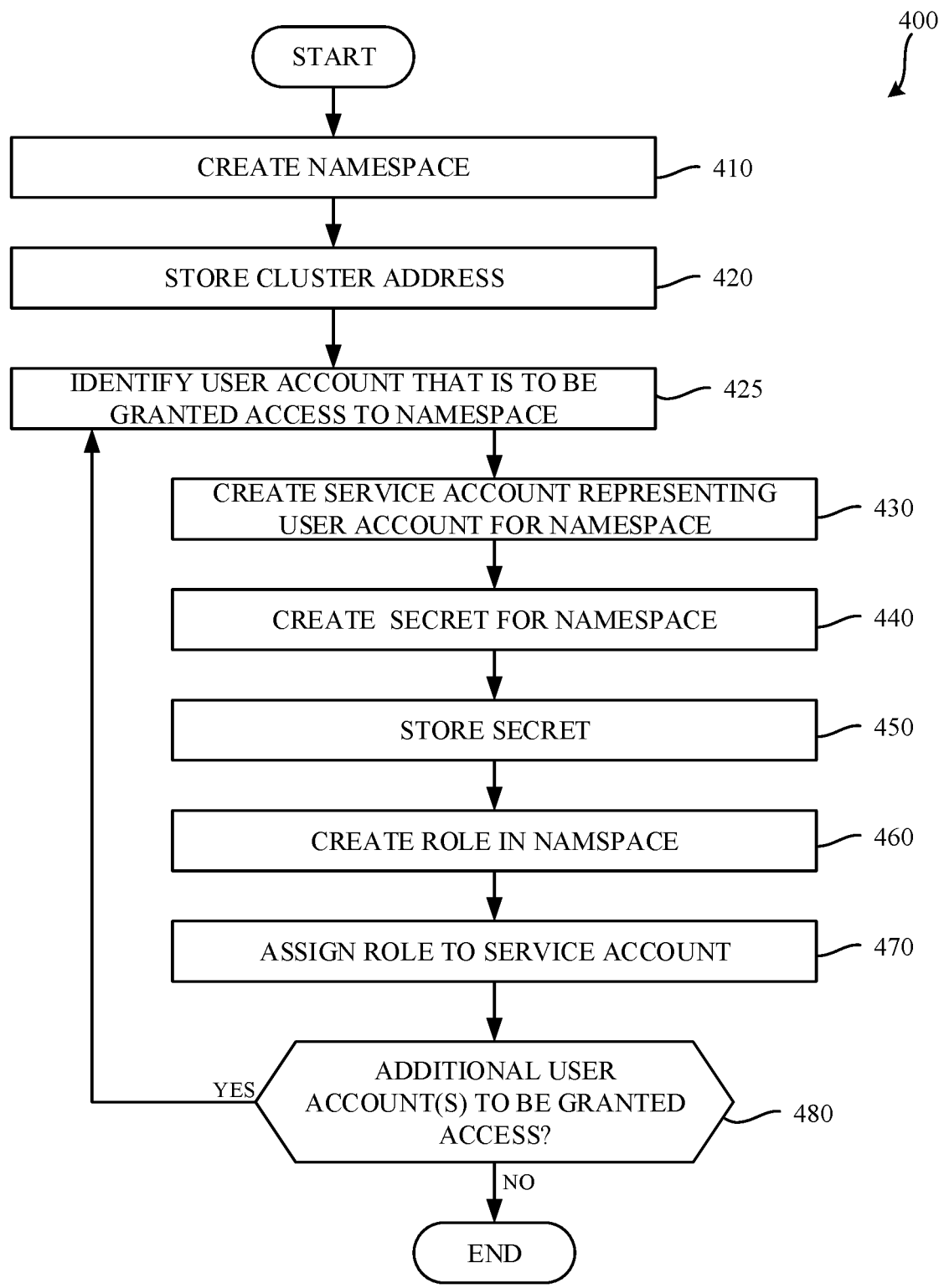
FIG. 4 is a flowchart representative of example machine readable instructions that, when executed, cause the cluster orchestrator of FIGS. 1 and/or 2 to create and configure a namespace.

Flowcharts representative of example hardware logic, machine readable instructions, hardware implemented state machines, and/or any combination thereof for implementing the example cluster orchestrator 133 of FIG. 2 are shown in FIGS. 4 and/or 5. The machine readable instructions may be one or more executable programs or portion(s) of an executable program for execution by a computer processor and/or processor circuitry, such as the processor 812 shown in the example processor platform 800 discussed below in connection with FIG. 8. The program may be embodied in software stored on a non-transitory computer readable storage medium such as a CD-ROM, a floppy disk, a hard drive, a DVD, a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4 and/or 5, many other methods of implementing the example cluster orchestrator 133 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4 and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions that, when executed, cause the cluster orchestrator 133 of FIGS. 1 and/or 2 to create and configure a namespace. The example process 400 of the illustrated example of FIG. 4 begins when the example interface server 210 receives an instruction to create a namespace. In some examples, the instruction is received via the interface server 210 (e.g., via a web interface). However, any other approach to receiving and/or accessing an instruction may additionally or alternatively be used. The example namespace creator 220 creates the requested namespace. (Block 410). In examples disclosed herein, the namespace creator 220 interfaces with the automation manager 130 to create the namespace.

The example namespace creator 220 stores the namespace information in the namespace information memory 225. (Block 420). In examples disclosed herein, the namespace information includes an address of the namespace. The stored namespace information is later used for creation of a configuration file that enables a user to access the namespace. Thus, the namespace information may include any additional information that may be used for creation of the configuration file for accessing the namespace.

The example permission manager 230 identifies a user account that is to be granted access to the namespace. (Block 425). The example permission manager 230 creates a service account representing the user account for the namespace. (Block 430). The example permission manager 230 creates secret information for the user account for accessing the namespace. (Block 440). In examples disclosed herein, the secret information includes a password. The example permission manager 230 stores the secret information in the namespace information memory 225. (Block 450). Storing the secret information allows the secret information to later be recalled when generating a configuration file for the user.

The example permission manager 230 creates a role within the namespace. (Block 460). The example role is created with appropriate permissions for the identified user account. In some examples, a role having the desired permissions may already exist. In such an example, the permission manager 230 may either skip creation of the role or, alternatively may create a copy of the role that is specific to the service account (e.g., with a slightly varied name). Creating a copy of the role enables subsequent permissions changes associated with the role to be applied to the service account without unintentionally affecting other user accounts that might be associated with a particular role. Not creating the copy of the role, conversely, allows multiple user accounts to be associated with the role, and as a result, enables a single permission change to the role to affect the associated user accounts.

The example permission manager 230 assigns the created role to the service account. (Block 470). Thus, when a user uses a configuration file specifying the service account, the user will be afforded the permissions of the role associated with the user account.

The example permission manager 230 determines whether an additional user account to be granted access is to be created. (Block 480). If an additional user account is to be granted access, control proceeds to block 425 where the subsequent user account that is to be granted access to the namespace is identified (Block 425) and the appropriate account creation and linking with a role is performed (Blocks 430 through 470). The example process of block 425 through blocks 480 is repeated for any user accounts for which access is to be granted. Upon the permission manager 230 determining that no additional accounts are to be created (e.g., Block 480 returning a result of NO), the example process 400 of FIG. 4 terminates. The example process may be repeated upon for example, a subsequent instruction to create a namespace.

While in the illustrated example of FIG. 4, roles and service accounts are created as part of the creation of the namespace, creation of such roles and service accounts might alternatively be performed at a later time. For example, such roles and/or accounts could be created in response to a user request, and/or an indication that one or more additional roles and/or service accounts are to be created. As described below in connection with FIG. 5, a configuration file is generated that allows a user to access a namespace. Creation of the corresponding role(s) may, in some examples, be performed upon receipt of the request for generation of the configuration file. Such on-demand creation of roles and/or accounts reduces initial namespace creation processing requirements.

Figure 5:
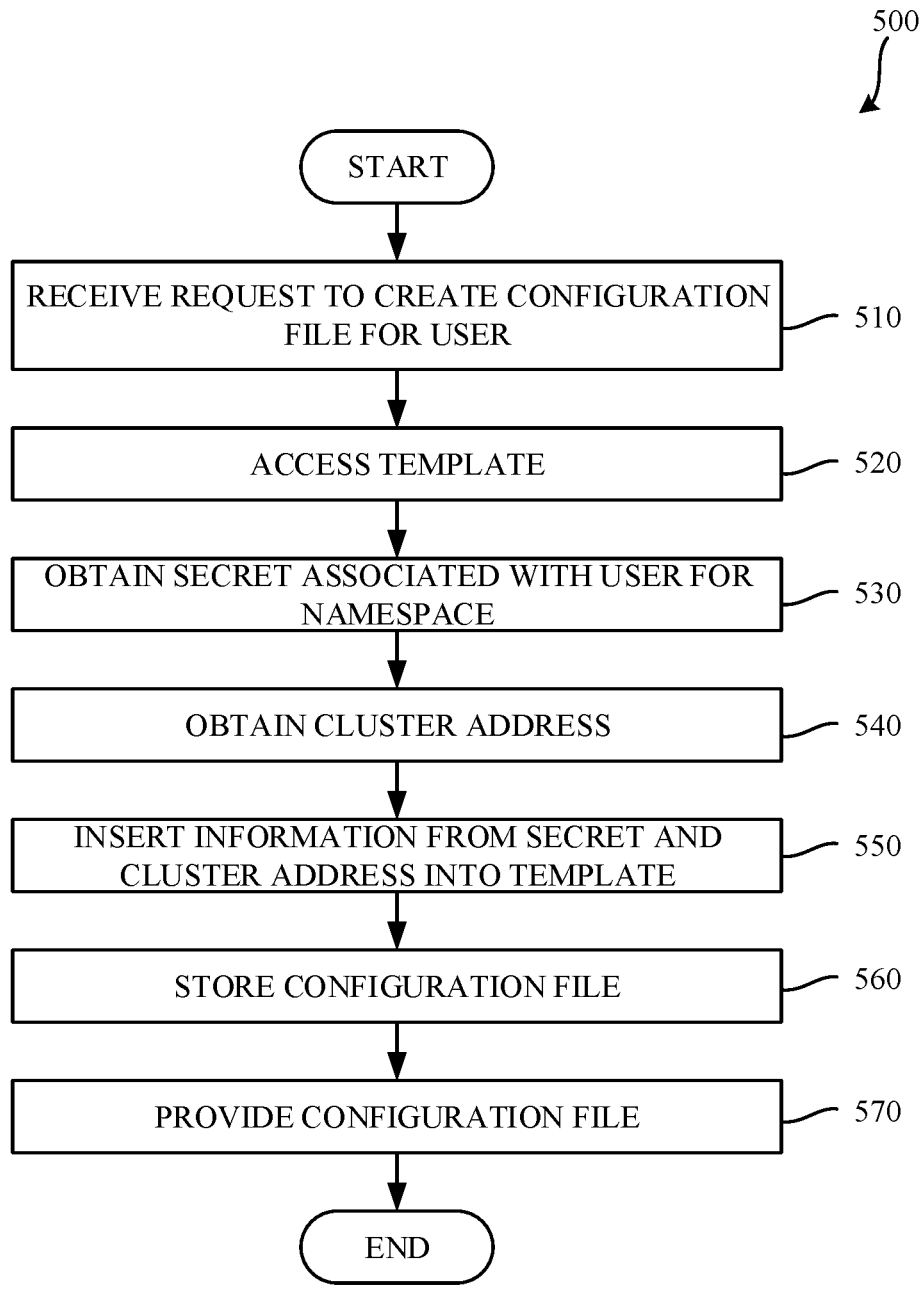
FIG. 5 is a flowchart representative of example machine readable instructions that, when executed, cause the cluster orchestrator of FIGS. 1 and/or 2 to generate a configuration file.

FIG. 5 is a flowchart representative of example machine readable instructions 500 that, when executed, cause the cluster orchestrator 133 of FIGS. 1 and/or 2 to generate a configuration file. In examples disclosed herein, the configuration file is a KubeConfig file that is used to control access by a user to a Kubernetes system. Kubeconfig files are used to organize information about clusters, users, namespaces, and authentication mechanisms by the user. For example, the user may utilize a command-line tool, such as kubectl, to process the configuration file and communicate with a server of a cluster. However, any other type of configuration file may additionally or alternatively be generated.

The example process 500 of FIG. 5 begins when the example configuration file generator 240 receives a request to create a configuration file for a user. (Block 510). The example configuration file generator 240 accesses a template stored in the example template memory 235. (Block 520). The example configuration file generator 240 obtains secret information associated with the service account for the user that is associated with the namespace. (Block 530). The example configuration file generator 240 obtains the cluster address. (Block 540). In examples disclosed herein, the cluster address and the secret information associated with the service account for the user that is associated with the namespace are obtained from the namespace information memory 225. However, in some examples, the namespace information and secret information may be provided to the configuration file generator 240 via, for example the interface server 210 (e.g., by a user).

The example configuration file generator 240 inserts the secret information and the cluster address into the template. (Block 550). An example template including sections where such information is to be inserted is disclosed below in connection with FIG. 7. The example configuration file generator 240 stores the configuration file in the example namespace information memory 225. (Block 560). In this manner, the completed configuration file can be provided to the user at a later time without the need for re-generation of the configuration file. However, in some examples, the stored configuration file may be removed after a period of time (e.g., after the file is provided to the user, after a threshold amount of time has elapsed, etc.) to reduce resource requirements. The example configuration file generator 240 provides the configuration to the requesting user via the interface server 210. (Block 570). The example process 500 of FIG. 5 then terminates, but may be repeated upon, for example, a subsequent request for a configuration file.

Figure 6:
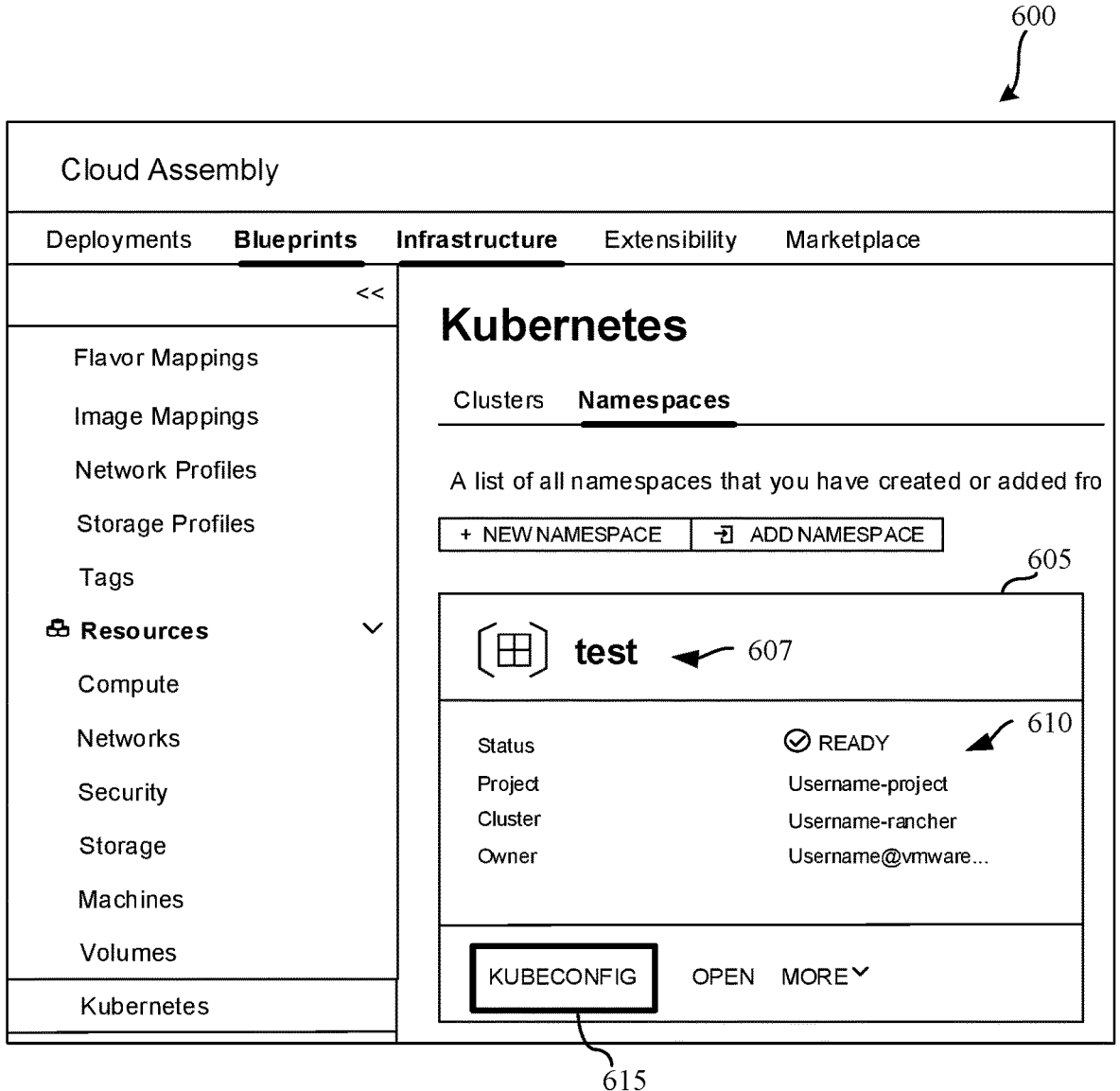
FIG. 6 is an example user interface that may be presented by the example user interface of the example cluster orchestrator of FIG. 2.

FIG. 6 is an example user interface 600 that may be presented by the example interface server 210 of the example cluster orchestrator 133 of FIG. 2. The example user interface 600 includes a namespace section 605. In the illustrated example of FIG. 6, a single namespace section 605 is shown. However, in some examples, multiple namespace sections may be displayed. The example namespace section 605 displays a name 607 of the namespace. In the illustrated example of FIG. 6, the name 607 of the namespace is "test." However, any other namespace name may additionally or alternatively be used. The example namespace section 605 includes namespace information 610, and a button for requesting a configuration file 615. In the illustrated example of FIG. 6, the button, when clicked, causes the configuration file generator 240 to generate a configuration file as explained in connection with FIG. 5.

FIG. 7 is a template configuration file 710 that may be utilized by the example cluster orchestrator 133 of FIGS. 1 and/or 2. In the illustrated example of FIG. 7, the template configuration file 710 includes template text representing portions of the template configuration file 710 that do not change during generation of the configuration file. The example template configuration file 710 includes a cluster certificate section 720, an address section 725, a user certificate section 730, and a token section 735. In examples disclosed herein, when generating the configuration file, the example configuration file generator 240 replaces the cluster certificate section 720, the address section 725, the user certificate section 730, and the token section 735 with the appropriate information from the namespace information memory 225. In some examples, additional sections of the template configuration file may additionally be modified such as, for example, a name of the namespace, a name of the cluster, a username, a context, etc.

Figure 8:
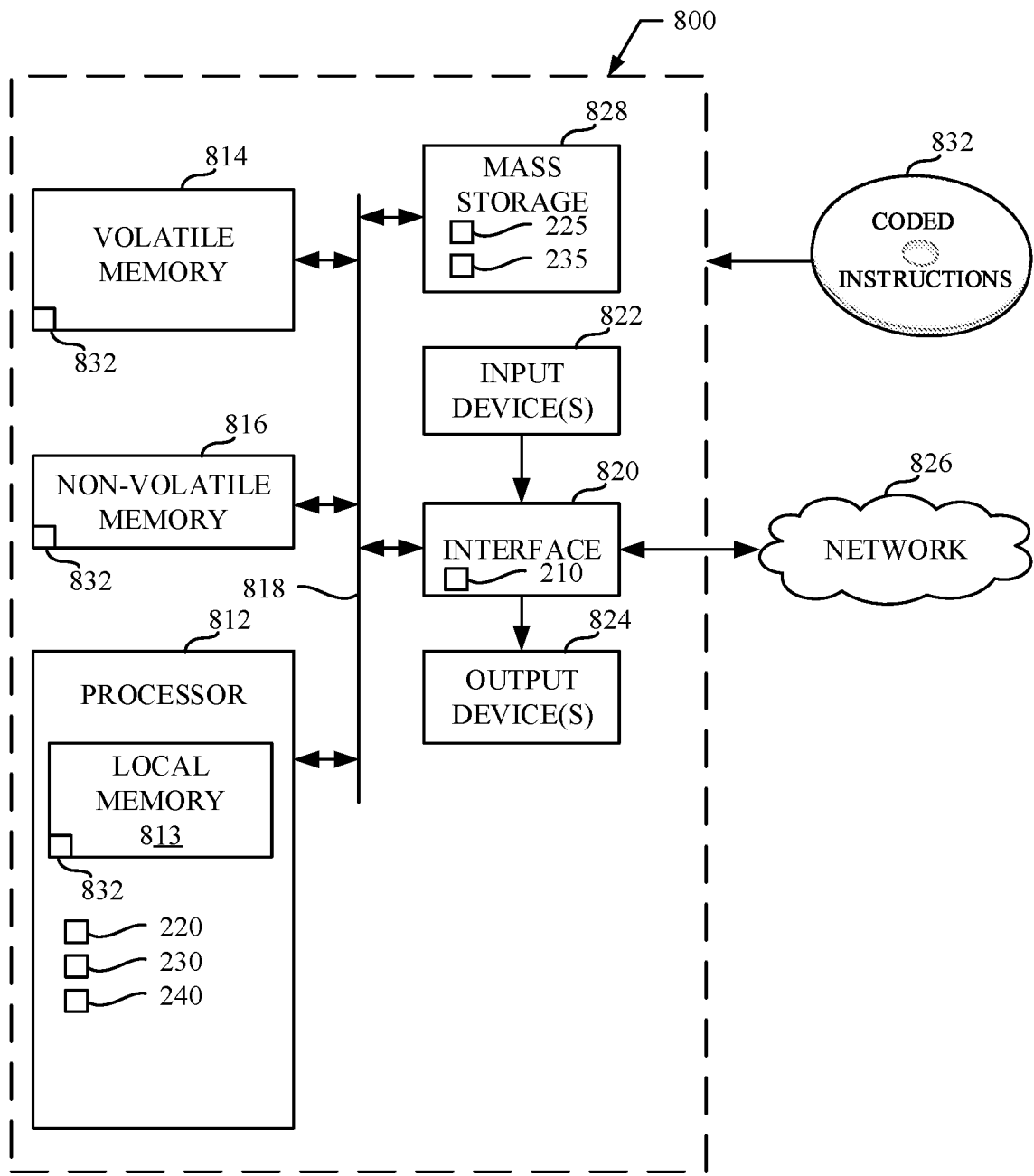
FIG. 8 is a block diagram of an example processing platform structured to execute the instructions of FIGS. 4 and/or 5 to implement the example cluster orchestrator of FIGS. 1 and/or 2.

FIG. 8 is a block diagram of an example processor platform 800 structured to execute the instructions of FIGS. 4 and/or 5 to implement the example cluster orchestrator 133 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example namespace creator 220, the example permission manager 230, and the example configuration file generator 240.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc. In the illustrated example of FIG. 8, the interface circuit 820 implements the example interface server 210.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives. In the illustrated example of FIG. 8, the example mass storage devices 828 implement the example namespace information memory 225 and/or the example template memory 235.

The machine executable instructions 832 of FIGS. 4 and/or 5 may be stored in the mass storage device 828, in the volatile memory 814, in the non-volatile memory 816, and/or on a removable non-transitory computer readable storage medium such as a CD or DVD.

Figure 9:
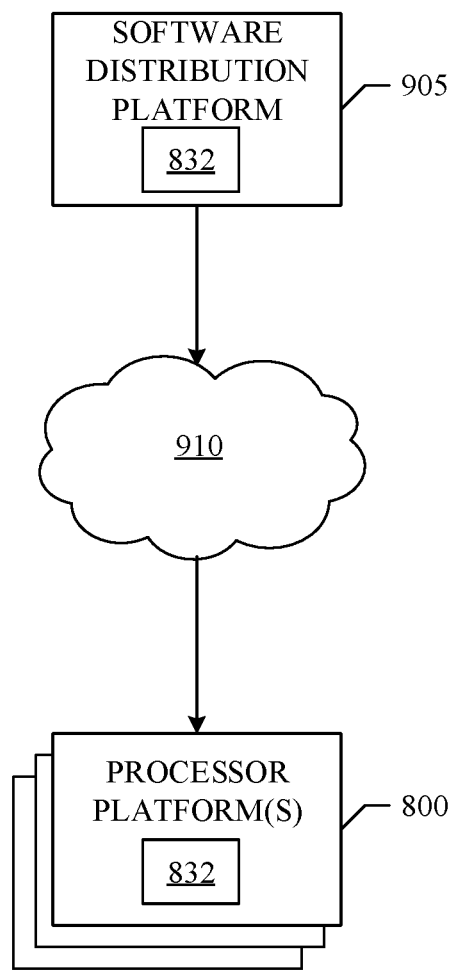
FIG. 9 is a block diagram of an example software distribution platform to distribute software (e.g., software corresponding to the example computer readable instructions of FIGS. 4 and/or 5) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 905 to distribute software such as the example computer readable instructions 832 of FIG. 8 to third parties is illustrated in FIG. 9. The example software distribution platform 905 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 832 of FIG. 8. The third parties may be consumers, users, retailers, OEMs, etc., who purchase and/or license the software for use and/or re-sale and/or sub-licensing. In the illustrated example, the software distribution platform 905 includes one or more servers and one or more storage devices. The storage devices store the computer readable instructions 832, which may correspond to the example computer readable instructions 400, 500 of FIGS. 4 and/or 5, as described above. The one or more servers of the example software distribution platform 905 are in communication with a network 910, which may correspond to any one or more of the Internet and/or any of the example networks 826 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 832 from the software distribution platform 905. For example, the software, which may correspond to the example computer readable instructions 832 of FIG. 8, may be downloaded to the example processor platform 800, which is to execute the computer readable instructions 832 to implement the cluster orchestrator 133. In some example, one or more servers of the software distribution platform 905 periodically offer, transmit, and/or force updates to the software (e.g., the example computer readable instructions 832 of FIG. 8) to ensure improvements, patches, updates, etc. are distributed and applied to the software at the end user devices.

From the foregoing, it will be appreciated that example methods, apparatus and articles of manufacture have been disclosed that enable creation of access restrictions to a Kubernetes namespace as the namespace is created. Such an approach hides the complexity of manual RBAC configuration of the Kubernetes namespace and/or cluster. Such an approach advantageously provides a configuration file to enable a user to access the Kubernetes namespace. The disclosed methods, apparatus and articles of manufacture improve the efficiency of using a computing device by automatically generating configuration files, thereby improving accessibility to the Kubernetes resources. Such an approach is implemented using role-based access control, thereby ensuring that users are granted access only to their intended resources and are not automatically granted administrator-level permissions. The disclosed methods, apparatus and articles of manufacture are accordingly directed to one or more improvement(s) in the functioning of a computer.

Example methods, apparatus, systems, and articles of manufacture for automatic configuration of a containerized computing namespace are disclosed herein. Further examples and combinations thereof include the following.

Example 1 includes an apparatus for configuration of containerized computing namespaces, the apparatus comprising at least one processor, memory including machine readable instructions that, when executed by the at least one processor, cause the at least one processor to at least identify, in response to creation of a containerized computing namespace, a user account that is to be granted access to the containerized computing namespace, create a service account, the service account representing the user account for the containerized computing namespace, create a role within the containerized computing namespace, and assign a role binding between the role and the service account.

Example 2 includes the apparatus of example 1, wherein the instructions, when executed, cause the at least one processor to store a secret associated with the service account.

Example 3 includes the apparatus of example 2, wherein the instructions, when executed, cause the at least one processor to generate, in response to a request associated with the user account, a configuration file including a name of the containerized computing namespace and the secret associated with the service account.

Example 4 includes the apparatus of example 3, wherein the instructions, when executed, cause the at least one processor to provide the configuration file to the user, the configuration file to be used by the user to access the containerized computing namespace.

Example 5 includes the apparatus of example 2, wherein the secret includes a certificate and a token.

Example 6 includes the apparatus of example 1, wherein the instructions, when executed, cause the at least one processor to create the containerized computing namespace.

Example 7 includes the apparatus of example 1, wherein the instructions, when executed, cause the at least one processor to assign permissions to the role.

Example 8 includes at least one non-transitory computer readable medium comprising instructions that, when executed, cause at least one processor to at least identify, in response to creation of a containerized computing namespace, a user account that is to be granted access to the containerized computing namespace, create a service account, the service account representing the user account for the containerized computing namespace, create a role within the containerized computing namespace, and assign a role binding between the role and the service account.

Example 9 includes the at least one non-transitory computer readable medium example 8, wherein the instructions, when executed, cause the at least one processor to store a secret associated with the service account.

Example 10 includes the at least one non-transitory computer readable medium of example 9, wherein the instructions, when executed, cause the at least one processor to generate, in response to a request associated with the user account, a configuration file including a name of the containerized computing namespace and the secret associated with the service account.

Example 11 includes the at least one non-transitory computer readable medium of example 10, wherein the instructions, when executed, cause the at least one processor to provide the configuration file to the user, the configuration file to be used by the user to access the containerized computing namespace.

Example 12 includes the at least one non-transitory computer readable medium of example 9, wherein the secret includes a certificate and a token.

Example 13 includes the at least one non-transitory computer readable medium of example 8, wherein the instructions, when executed, cause the at least one processor to create the containerized computing namespace.

Example 14 includes the at least one non-transitory computer readable medium of example 8, wherein the instructions, when executed, cause the at least one processor to assign permissions to the role.

Example 15 includes a method for configuration of containerized computing namespaces, the method comprising identifying, by executing an instruction with at least one processor, in response to creation of a containerized computing namespace, a user account that is to be granted access to the containerized computing namespace, creating, by executing an instruction with the at least one processor, a service account, the service account representing the user account for the containerized computing namespace, creating a role within the containerized computing namespace, and assigning a role binding between the role and the service account.

Example 16 includes the method of example 15, further including storing a secret associated with the service account.

Example 17 includes the method of example 16, further including generating, in response to a request associated with the user account, a configuration file including a name of the containerized computing namespace and the secret associated with the service account.

Example 18 includes the method of example 17, further including providing the configuration file to the user, the configuration file to be used by the user to access the containerized computing namespace.

Example 19 includes the method of example 16, wherein the secret includes a certificate and a token.

Example 20 includes the method of example 15, further including creating the containerized computing namespace.

Example 21 includes the method of example 15, wherein the creating of the role within the containerized computing namespace further includes assigning permissions to the role.

Example 22 includes the method of example 15, wherein the containerized computing namespace is a Kubernetes namespace.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus for configuration of a containerized computing namespaces, the apparatus comprising:
at least one processor;
memory including machine readable instructions that, when executed by the at least one processor, cause the at least one processor to at least:
identify, in response to creation of a containerized computing namespace, a user account that is to be granted access to the containerized computing namespace, the containerized computing namespace being associated with resources representing one or more Kubernetes pods;
create a service account, the service account representing the user account for the containerized computing namespace;
create a role within the containerized computing namespace;
assign a role binding between the role and the service account;
store a secret associated with the service account, the secret being stored in a namespace information memory, the secret being recalled for configuration file generation for the user account, wherein the secret includes a certificate and a token;
generate a configuration file including a name of the containerized computing namespace and the secret associated with the service account;
monitor the containerized computing namespace; and
provide the configuration file to a user, the configuration file to be used to grant access the containerized computing namespace;
wherein the resources associated with the containerized computing namespace are assigned based on roles assigned to users.

2. The apparatus of claim 1, wherein the instructions, when executed, cause the at least one processor to create the containerized computing namespace.

3. The apparatus of claim 1, wherein the instructions, when executed, cause the at least one processor to assign permissions to the role.

4. The apparatus of claim 1, wherein the roles are defined to limit access to a resource within a namespace.

5. At least one non-transitory computer readable medium comprising instructions that, when executed, cause at least one processor to at least:
identify, in response to creation of a containerized computing namespace, a user account that is to be granted access to the containerized computing namespace, the containerized computing namespace being associated with resources representing one or more Kubernetes pods;
create a service account, the service account representing the user account for the containerized computing namespace;
create a role within the containerized computing namespace;
assign a role binding between the role and the service account;
store a secret associated with the service account, the secret being stored in a namespace information memory, the secret being recalled for configuration file generation for the user account, wherein the secret includes a certificate and a token;
generate a configuration file including a name of the containerized computing namespace and the secret associated with the service account;
monitor the containerized computing namespace; and
provide the configuration file to a user, the configuration file to be used to grant access the containerized computing namespace;
wherein the resources associated with the containerized computing namespace are assigned based on roles assigned to users.

6. The at least one non-transitory computer readable medium of claim 5, wherein the instructions, when executed, cause the at least one processor to create the containerized computing namespace.

7. The at least one non-transitory computer readable medium of claim 5, wherein the instructions, when executed, cause the at least one processor to assign permissions to the role.

8. A method for configuration of a containerized computing namespaces, the method comprising:
identifying, by executing an instruction with at least one processor, in response to creation of a containerized computing namespace, a user account that is to be granted access to the containerized computing namespace, the containerized computing namespace being associated with resources representing one or more Kubernetes pods;
creating, by executing an instruction with the at least one processor, a service account, the service account representing the user account for the containerized computing namespace;
creating a role within the containerized computing namespace;
assigning a role binding between the role and the service account;
storing a secret associated with the service account, the secret being stored in a namespace information memory, the secret being recalled for configuration file generation for the user account, wherein the secret includes a certificate and a token;

generating a configuration file including a name of the containerized computing namespace and the secret associated with the service account;

monitor the containerized computing namespace; and providing the configuration file to a user, the configuration file to be used to grant access the containerized computing namespace;

wherein the resources associated with the containerized computing namespace are assigned based on roles assigned to users.

9. The method of claim 8, further including creating the containerized computing namespace.

10. The method of claim 8, wherein the creating of the role within the containerized computing namespace further includes assigning permissions to the role.

11. The method of claim 8, wherein the containerized computing namespace is a Kubernetes namespace.

* * * * *